Patented Apr. 22, 1952

2,594,217

UNITED STATES PATENT OFFICE 2,594,217

SPONGE RUBBER CONTAINING WAX

Thomas H. Rogers, Jr., and Walter T. L. Ten Broeck, Akron, Ohio, assignors to Wingfoot Corporation, Akron, Ohio, a corporation of Delaware No Drawing. Application October 1, 1949, Serial No. 119,202

11 Claims. (Cl. 260—2.5)

This invention relates to frothed rubber latex sponge containing a small amount of a solid, hard paraffin wax.

The preparation of sponge-like compositions from natural rubber latex is a well-known and widely used procedure. Concentrated latices, containing for example 50 to 65 percent of rubber solids, are mixed with latex stabilizing agents, curing agents, gelling agents, and other modifying chemicals and then vigorously agitated to produce a foam. By the action of the gelling agents contained in the latex, the foam is converted into a weak but self-sustaining solid material which retains its shape throughout a subsequent curing operation. After curing the gelled mass at a temperature between 160 and 400° F., a tough elastic sponge-like composition is obtained. This prior art method is widely used in treating natural and synthetic rubber latices. Although the preparation of sponges from polychloroprene rubbers has been moderately effective, a similar treatment of the butadiene copolymer latices, such as the butadiene-acrylonitrile and butadiene-styrene copolymers, produces compositions of lower tensile properties and low resistance to shearing forces.

As stated, either natural or synthetic rubber latices can be foamed, gelled and cured to form a valuable sponge-like composition. Such compositions, however, are objectionable by reason of the tackiness of the cured sponge. This undesirable property of tackiness causes the sponge to take a permanent set or to be slow in returning to its former shape after it has been compressed. It now has been discovered that the addition of a small amount of a solid, hard wax eliminates tackiness in the cured sponge and at the same time adds a desirable property which is termed in the trade "snap." In determining the "snap" possessed by sponge rubber, the sponge to be tested is freshly made and cut so that a clean, square corner is exposed. The exposed corner is then squeezed between the thumb and index finger of the person testing for the "snap" and turned two complete revolutions, and held in this squeezed and twisted position for 30 seconds before releasing. A sponge having good "snap" will go back to its normal shape immediately. A sponge having a poor "snap" will go back to its normal shape at a slower rate.

In addition to this undesirable property of tackiness possessed by natural and synthetic rubber latex sponges, sponges made of synthetic rubber latex alone or admixed with natural rubber latex, possess the further objectionable property of being combustible. In the normal use of upholstered furniture or other articles made of sponge rubber, fires may result from contact with lighted cigarettes or sparks. A sponge made from synthetic rubber latex or a mixture of synthetic rubber and natural rubber latex will be entirely consumed and completely destroyed through combustion. It has been discovered, however, that when the rubber sponge contains a small amount of a solid, hard paraffin wax, this problem of combustion is greatly eliminated, and in most cases entirely eliminated. The ability of the sponge to resist consumption through combustion is tested by placing a lighted cigarette on the surface of the sponge at the center thereof in an atmosphere of still air. Sponge rubber not containing wax will be consumed as the cigarette burns to the end and causes sintering of the sponge down and throughout the sponge. In the case of sponge containing wax, the cigarette burns to the end and only a very slight amount of sintering takes place at the very surface of the sponge.

In addition to observing these improvements concerning resistance to combustion and elimination of tackiness possessed by sponge rubber containing paraffin wax, it has also been observed that the sponge rubber containing paraffin wax possesses an increased compression/weight ratio compared to sponge rubber not containing the same paraffin wax. This is unexpected because it is generally understood in the sponge rubber art that the presence of any material other than rubber is to be considered a filler, and accordingly must be replaced by rubber in order to produce a certain compression/weight ratio. In the present invention, the exact opposite result has been experienced, in that the addition of a small amount of a solid, hard paraffin wax not only directly replaces this amount of rubber to maintain the same compression/weight ratio but actually improves the compression/weight ratio so as to function in such a manner that one would be led to believe that additional rubber had been added.

Thus, in accordance with this invention, it has been found that by the addition of a small proportion of a solid, hard paraffin wax to the latex prior to the gellation and curing steps, an improved sponge-like composition is formed. It has been found that the amount of paraffin wax added is critical. The critical amount of paraffin wax that may be added ranges from 0.5 to 5% by weight and it is preferred to add from 1 to 3% by weight based upon the amount of rubber present. When an amount less than 0.5% is used, no discernible results are obtained with regard to improved compression/weight ratio, resistance to combustion and improved "snap." When the sponge contains more than 5 parts of paraffin wax, the improved property of "snap" and compression/weight ratio is no longer observed. Furthermore, what compression is possessed by the sponge varies with change in temperature. In addition, the shrinkage factor of the sponge increases to the point where it becomes intolerable. Sponge made with more than 5 parts of paraffin wax shrinks so badly in the mold that the sponge is torn on the lugs of a lug mold and is further torn in attempting to remove the shrunken sponge from the mold. The situation becomes more intolerable as the amount of paraffin wax is increased.

Any solid, hard paraffin wax having a melting point in the range between 42° C. to 60° C. (ASTM D87–42) may be used. A preferred solid paraffin wax is the kind offered to the trade as "Parowax," sold by Standard Oil of New York, which is a mixture of solid hydrocarbons of the methane series and derived from petroleum, and having a melting point in the range between 50° C. to 52° C.

The new improved sponge-like compositions are made by methods very similar to the methods now in use for making sponge-like compositions. The natural latex, synthetic rubber latex, or mixtures of natural and synthetic rubber latices are prepared with sufficient quantities of stabilizing agents for the purpose of retaining the rubber particles in suspension throughout the compounding operations. Natural rubber latex is customarily stabilized by the addition of ammonia or alkali metal hydroxides, while the synthetic rubber latices are usually stabilized by any one of a wide variety of organic chemicals which have both strongly hydrophilic and strongly hydrophobic radicals. A wide variety of these compounds is known and is available commercially, for example, potassium oleate soap, rosin soaps, sodium stearate, potassium lauryl sulfate, sulfonated hydrocarbons, and sodium alkyl naphthalene sulfate.

The stable latex is frequently compounded with a thickening agent, such as casein, gum tragacanth, or water glass. Conventional antioxidants, such as phenyl-beta-naphthylamine, dibeta-naphthyl-paraphenylene diamine, and the heptyl-diphenylamines, and conventional accelerators such as the zinc salt of mercaptobenzothiazole, benzo-thiazyl disulfide, zinc diethyldithiocarbamate and tetramethylthiuram disulfide are then added. Other modifying agents which may be used optionally are castor oil, which improves the elastic properties of the sponge, carbon blacks which are loading agents, magnesium oxide and calcium silicate which strengthen or stiffen the sponge, and various dyes and coloring matters for improving the appearance of the composition.

The compounded latex prepared in accordance with the prior art, and preferably in accordance with the preceding paragraph, is then mixed with the paraffin wax, which is first emulsified, for example with potassium oleate in an aqueous solution. After the paraffin wax is thoroughly mixed into the latex, the mixture is foamed by rapid agitation, and after the desired frothing, the composition is gelled in the conventional manner by adding the gelling agent, such as sodium fluorosilicate, ammonium sulfate, ammonium nitrate, calcium sulfate, and/or 2-nitro-2-methyl-1-propanol. After the gelling agent is added, the composition is poured into a suitable mold and permitted to gel. The weak gel thereby obtained is vulcanized by heating between the temperatures of 160° F. and 400° F. for a sufficient period of time to completely cure the composition.

The sponge-like compositions prepared in accordance with this invention may be used in identical manner to those of the prior art, and are particularly useful in the fabrication of household furniture and automobile seats because of the improved resistance to combustion, especially from lighted tobacco.

Further details of the preparation of sponge rubber in accordance with this invention are set forth with respect to the following examples.

EXAMPLE 1

*Preparation of paraffin wax emulsion*

A paraffin wax emulsion was prepared by melting 50 parts by weight of a paraffin wax having a melting point of 57.22° C. (135° F.) with 5 parts by weight of oleic acid. Five parts by weight of potassium hydroxide was dissolved in 65 parts of water and heated to a temperature of 80° C. While agitating the potassium hydroxide solution at high speed, the paraffin oleic acid mixture was added thereto and the final mixture kept warm until it was added with stirring to the latex mixture described in Example 2.

EXAMPLE 2

A quantity of 40 parts by weight of dry rubber of a natural rubber latex containing 62.8 percent solids was mixed with 1.06 parts of 12.5 percent solution of potassium rosinate soap and .59 parts of a 20 percent solution of potassium oleate. A quantity of 60 parts by weight of dry rubber of a butadiene-styrene copolymer (70 percent butadiene and 30 percent styrene) containing 59.8 percent solids was then mixed thoroughly with the natural rubber latex. The following materials were then added as conventional dispersions, parts by weight being indicated.

|  | Per cent Solids | Dry Pts. by Wt. |
| --- | --- | --- |
| Sulfur | 55 | 2.05 |
| Zinc diethyldithiocarbamate | 35 | 0.31 |
| Carbon black | 25 | 0.08 |
| Zinc mercaptobenzothiazole | 40 | 1.55 |
| Phenyl-beta-naphthylamine | 40 | 1.04 |

A paraffin emulsion containing 2.5 parts solids by weight was prepared in accordance with the preceding example and added to the latex. After all of the compounding ingredients had been thoroughly mixed and the latex foamed in the usual manner, 2.8 parts by dry weight of zinc oxide and 1.08 parts dry weight of diphenylguanidine were added simultaneously as a 39.4 percent dispersion. A 20 percent dispersion of sodium silico-fluoride in the amount of 2 parts by weight of the effective component was then added and stirred for 1½ minutes. The latex was then poured into a mold and gellation allowed to take place. After curing for 15 minutes at 15 pounds steam pressure and drying, a very desirable sponge rubber composition free of tack was obtained. This sponge did not burn when contacted with a lighted cigarette, whereas a control sponge prepared in identical manner except without the paraffin was completely burned when a lighted cigarette was placed on its surface.

Samples of frothed rubber latex sponge were prepared in accordance with the formulation used in Example 2, but using a mixture comprising 45 parts of natural rubber latex and 55 parts of synthetic rubber latex resulting from the polymerization of a mixture comprising 70% of butadiene-1,3 and 30% of styrene. Tests show the results obtained when using less than 0.5 parts of paraffin wax and using more than 5 parts of paraffin wax. The results of various tests made on the sponge containing various amounts of paraffin wax are set forth in the following table.

| Examples | 3 | 4 | 5 | 6 | 7 | 8 |
|---|---|---|---|---|---|---|
| 1. 45 Natural/55 Butadiene/styrene Rubber. | 100.00 | 100.00 | 100.00 | 100.00 | 100.00 | 100.00 |
| 2. Per cent Paraffin (M. P. 135° F.) on Rubber. | 0.15 | 1.45 | 3.20 | 5.00 | 10.00 | 15.00 |
| 3. Mold size cm. 24.7 x 24.7 x 3.34. | | | | | | |
| 4. Mold Vol (cc.) | 2040 | 2040 | 2040 | 2040 | 2040 | 2040 |
| 5. Volume (cc.) of dry sponge | 1422 | 1420 | 1330 | 1285 | 860 | 655 |
| 6. Per cent Shrinkage | 30.2 | 30.5 | 34.5 | 37.5 | 58 | 68 |
| 7. Per cent More shrinkage than control. | 0 | .9 | 14.1 | 34. | 92. | 125. |
| 8. Density #/in.³ | .00386 | .00366 | .00412 | .00406 | .00977 | .01360 |
| 9. Permanent Set Retention (per cent). | 93.1 | 93.1 | 92.8 | 92.8 | 74 | 59 |
| 10. Per cent More Permanent set than control. | 0 | 0 | 3.23 | 3.23 | 25.8 | 57.8 |
| 11. Water Repellent Test (Time in min. required for 25 cc. of H₂O to pass through sponge). | .07 | .06 | .065 | .070 | .190 | .490 |
| 12. Cold Test (—20° F.) | Flexible | Flexible | Flexible | Flexible | Stiff | Stiff |

In order to produce the improved sponge of this invention, it is necessary that the paraffins be used. The useful paraffis are the solid aliphatic hydrocarbons derived from petroleum which have a melting point in the range 42° C. to 60° C. (see the Condensed Chemical Dictionary, 3rd edition, page 487). Wax-like materials that are not solid or do not possess this melting point range will not work. Soft waxes have been used, including petrolatum, as well as such materials as lanolin, and mineral oil. However, none of these materials produce the desired results, as are produced when a solid, hard paraffin wax is used. Samples of sponge were prepared in accordance with the formulation used in Example 2, but using a mixture comprising 45 parts of natural rubber latex and 55 parts of synthetic rubber latex resulting from the polymerization of a mixture comprising 70% butadiene-1,3 and 30% styrene. Table 2 shows the results obtained when petrolatum, lanolin and mineral oil are substituted for paraffin (M. P. 135° F.).

The density of the sponge sample is expressed in pounds per cubic foot. The sponges are weighed and measured and the density is calculated by the formula $$D = \frac{\text{Weight (lbs.)}}{\text{Volume (ft.}^3\text{)}}$$

The compression is expressed in pounds by measuring the force required to compress a circular area of 8" diameter, 25% of its original thickness.

The compression/weight ratio is obtained by using the following formula $$\text{Compression/Weight Ratio} = \frac{\text{Compression (lbs.)}}{\text{Density (lbs./ft.}^3\text{)}}$$

The expression "rubber latex" is intended to include natural rubber latex and synthetic rubber latex. The use of latices of various rubber-like materials to form molded articles is desirably effected by adding a small amount of a hard wax.

In this connection, latices of natural rubber, butadiene-styrene copolymers, butadiene-acrylonitrile copolymers, polychloroprene, aqueous dispersions of reclaimed rubber, coagulated latex or vulcanized rubber, etc., or any other satisfactory latex or aqueous rubber-like dispersion or mixture thereof may be used in this manner. Other synthetic rubber latices may be used and these may be any latex selected from the class prepared by the polymerization in aqueous emulsion of a butadiene-1,3 hydrocarbon such as butadiene-1,3, isoprene, 2,3-dimethyl butadiene-1,3, piperylene or the like either alone or in admixture with each other and/or in admixture with lesser or equal amounts of one or more monoethylenic compounds copolymerizable therewith in aqueous emulsion such as acrylonitrile, methacrylonitrile, alphachloro acrylonitrile and similar acrylic nitriles; styrene, vinyl naphthalene, p-chlorostyrene and similar aryl olefins and substituted aryl olefins; methyl acrylate, methyl methacrylate, acrylamide and similar esters and amides of acrylic acids; methyl isopropenyl ketone, vinyli-

| Examples | 9 | 10 | 11 | 12 | 13 | 14 | 15 |
|---|---|---|---|---|---|---|---|
| 1. Kind of Sponge | Control | 2% Paraffin (m. p. 135° F.). | 5% Paraffin (m. p. 135° F.). | 2% Petrolatum. | 5% Petrolatum. | 2% Lanolin. | 2% Mineral oil. |
| 2. Density (lbs./ft.³) | 6.75 | 6.60 | 6.74 | 6.52 | 6.46 | 7.42 | 6.52. |
| 3. Compression (lbs.) | 24.5 | 29.5 | 30.5 | 24.5 | 24. | 27. | 21. |
| 4. Compression/Wt. Ratio. | 3.630 | 4.470 | 4.530 | 3.760 | 3.620 | 3.640 | 3.220. |
| 5. Snap | Poor | Very good | Very good | Poor | Good | Poor | Very poor. |
| 6. Cigarette Burning | Completely consumed. | Just where cigarette was placed. | Just where cigarette was placed. | Completely consumed. | Large amount of burning. | Completely consumed. | Completely consumed. | dene chloride, isobutylene, methyl vinyl ether, and other compounds containing a single ethylenic double bond, $>C=C<$, which are copolymerizable with butadiene-1,3 hydrocarbons in aqueous emulsion. In fact, any of the compounds which may be termed butalastics as defined in the book "Butalastic Polymers, a Treatise on Synthetic Rubbers" by Marchionna may be used with success.

This application is a continuation-in-part application of our co-pending application Serial No. 736,590, filed March 22, 1947, by Walter T. L. Ten Broeck and Thomas H. Rogers, Jr., now abandoned, and entitled "Latex Sponge."

Although the invention has been described with respect to specific examples, it is not intended that the details thereof shall be construed as limitations upon the scope of this invention.

We claim:

1. Frothed rubber latex sponge containing a synthetic rubbery polymer of a conjugated diene produced by polymerization in aqueous emulsion and present in an amount of at least 55% by weight based on the rubber content of the sponge, the sponge containing from 0.5 to 5% by weight based on the rubber content of the sponge, of a solid, hard paraffin wax having a melting point in the range from 42° C. to 60° C., the wax being substantially evenly distributed throughout the reticular structure of the sponge whereby burning of the sponge by means of a lighted cigarette placed on the surface of the sponge is inhibited.

2. Frothed rubber latex sponge containing a synthetic rubbery polymer of a conjugated diene produced by polymerization in aqueous emulsion and present in an amount of at least 55% by weight based on the rubber content of the sponge, the sponge containing from 0.5 to 5% by weight based on the rubber content of the sponge, of a solid, hard paraffin wax having a melting point in the range from 50° C. to 52° C., the wax being substantially evenly distributed throughout the reticular structure of the sponge whereby burning of the sponge by means of a lighted cigarette placed on the surface of the sponge is inhibited.

3. Frothed rubber latex sponge containing from 0.5 to 5% by weight based on the rubber content of the sponge, of a solid, hard paraffin wax having a melting point in the range from 42° C. to 60° C., the wax being substantially evenly distributed throughout the reticular structure of the sponge, whereby burning of the sponge by means of a lighted cigarette placed on the surface of the sponge is inhibited, the rubber component of the sponge being a rubbery copolymer of butadiene-1,3 and styrene produced by polymerization in aqueous emulsion.

4. Frothed rubber latex sponge containing from 0.5 to 5% by weight based on the rubber content of the sponge, of a solid, hard paraffin wax having a melting point in the range from 50° C. to 52° C., the wax being substantially evenly distributed throughout the reticular structure of the sponge whereby burning of the sponge by means of a lighted cigarette placed on the surface of the sponge is inhibited, the rubber component of the sponge being a copolymer of butadiene-1,3 and styrene produced by polymerization in aqueous emulsion.

5. Frothed rubber latex sponge containing from 0.5 to 5% by weight based on the rubber content of the sponge, of a solid, hard paraffin wax having a melting point in the range from 42° C. to 60° C., the wax being substantially evenly distributed throughout the reticular structure of the sponge whereby burning of the sponge by means of a lighted cigarette placed on the surface of the sponge is inhibited, the rubber component of the sponge being a copolymer of butadiene-1,3 and acrylonitrile produced by polymerization in aqueous emulsion.

6. Frothed rubber latex sponge containing from 0.5 to 5% by weight based on the rubber content of the sponge, of a solid, hard paraffin wax having a melting point in the range from 50° C. to 52° C., the wax being substantially evenly distributed throughout the reticular structure of the sponge whereby burning of the sponge by means of a lighted cigarette placed on the surface of the sponge is inhibited, the rubber component of the sponge being a copolymer of butadiene-1,3 and acrylonitrile produced by polymerization in aqueous emulsion.

7. Frothed rubber latex sponge containing from 0.5 to 5% by weight based on the rubber content of the sponge, of a solid, hard paraffin wax having a melting point in the range from 42° C. to 60° C., the wax being substantially evenly distributed throughout the reticular structure of the sponge whereby burning of the sponge by means of a lighted cigarette placed on the surface of the sponge is inhibited, the rubber component of the sponge being a mixture of natural rubber and at least 55% of the rubbery copolymer resulting from the aqueous emulsion polymerization of a mixture comprising butadiene-1,3 and styrene.

8. Frothed rubber latex sponge containing from 0.5 to 5% by weight based on the rubber content of the sponge, of a solid, hard paraffin wax having a melting point in the range from 42° C. to 60° C., the wax being substantially evenly distributed throughout the reticular structure of the sponge whereby burning of the sponge by means of a lighted cigarette placed on the surface of the sponge is inhibited, the rubber component of the sponge being a copolymer of 70 parts of butadiene-1,3 and 30 parts of styrene produced by polymerization in aqueous emulsion.

9. Frothed rubber latex sponge containing from 0.5 to 5% by weight based on the rubber content of the sponge, of a solid, hard paraffin wax having a melting point in the range from 42° C. to 60° C., the wax being substantially evenly distributed throughout the reticular structure of the sponge whereby burning of the sponge by means of a lighted cigarette placed on the surface of the sponge is inhibited, the rubber component of the sponge being a mixture of natural rubber and at least 55% of the rubbery copolymer resulting from the aqueous emulsion polymerization of a mixture comprising 70 parts of butadiene-1,3 and 30 parts of styrene.

10. In the method of preparing sponge-like compositions by frothing rubber latices containing a synthetic rubber polymer of a conjugated diene latex produced by polymerization in aqueous emulsion and present in an amount of at least 55% by weight based on the rubber content of the sponge, the step compounding the unfrothed latex with from 0.5 to 5% by weight, based on the rubber content of the latex, of an aqueous emulsion of a solid, hard paraffin wax having a melting point in the range from 42° C. to 60° C.

11. In the method of preparing sponge-like compositions by frothing rubber latices containing a synthetic rubbery polymer of a conjugated diene latex produced by polymerization in aqueous emulsion and present in an amount of at least 55% by weight based on the rubber content of the sponge, the step of compounding the unfrothed latex with from 0.5 to 5% by weight based on the rubber content of the latex, of an aqueous emulsion of a solid, hard paraffin wax having a melting point of 57.22° C.

THOMAS H. ROGERS, JR.
WALTER T. L. TEN BROECK.

(References on following page)

REFERENCES CITED

The following references are of record in the file of this patent:

UNITED STATES PATENTS

| Number | Name | Date |
|---|---|---|
| 2,100,714 | Hiers | Nov. 30, 1937 |
| 2,140,026 | Murphy et al. | Dec. 13, 1938 |
| 2,426,430 | Binns | Aug. 26, 1947 |
| 2,457,219 | Fischer | Dec. 28, 1948 |
| 2,469,894 | Rogers | May 10, 1949 |
| 2,484,434 | Van Buskirk et al. | Oct. 11, 1949 |
| 2,503,003 | Simpson et al. | Apr. 4, 1950 |

FOREIGN PATENTS

| Number | Country | Date |
|---|---|---|
| 397,700 | Great Britain | Aug. 31, 1933 |

OTHER REFERENCES

Bennett, "Commercial Waxes, pp. 1–3, pub. 1944, by Chemical Publishing Co., New York.